United States Patent Office 3,321,455
Patented May 23, 1967

3,321,455
FILM FORMING THERMOPLASTIC COMPOSITIONS OF IMPROVED MOISTURE FOGGING RESISTANCE
James E. Guillet, Don Mills, Ontario, Canada, and Robert L. Combs, Kingsport, Tenn., assignors to Eastman Kodak Company, Rochester, N.Y., a corporation of New Jersey
No Drawing. Filed Jan. 10, 1964, Ser. No. 336,860
10 Claims. (Cl. 260—94.9)

This invention relates to thermoplastic compositions of improved properties. More particularly, this invention relates to polyolefin compositions having improved properties. In a specific aspect, this invention relates to the prevention of moisture fogging on the surface of transparent self-supporting film prepared from thermoplastic materials and employed in the packaging of moist food products.

Film formed from thermoplastic materials such as polyolefins, cellulose esters, polyamides, polyesters, polycarbonates, polyethylene, polypropylene, and the like, generally exhibit a high resistance to moisture vapor transmission. This property makes such films particularly desirable packaging materials for moist foods because the moisture content of the food can be retained over long periods of time. Another desirable property of such films is their transparency which permits easy visual identification of food products packaged in such films. However, due to the aforementioned high resistance to moisture vapor transmission, foods packaged with films of thermoplastics and maintained at temperatures above the freezing point of water tend to fog. This fogging is a result of water which evaporates from the food surface, saturates the air space between the film and food and condenses on the inner surface of the film as liquid droplets of water. As more water droplets form on the inner thermoplastic surface an over-all fogging effect is produced which interferes with visual identification of the packaged food product.

It is evident, therefore, that the state of the art will be greatly enhanced by providing novel thermoplastic compositions which, in the form of film, are not subject to moisture fogging.

Accordingly, it is an object of this invention to provide thermoplastic compositions exhibiting improved properties.

Another object of this invention is to provide thermoplastic compositions which, in the form of film, exhibit improved resistance to moisture fogging.

Another object of this invention is to impart resistance to moisture fogging to films prepared from solid film forming polyolefins such as polyethylene, polypropylene, polybutene, propylene butene copolymers or the like.

Still another object of this invention is to provide clear, self-supporting films from thermoplastic materials which films exhibit improved resistance to surface fogging upon exposure to humid atmosphere.

Still another object of this invention is to provide improved thermoplastic compositions containing an N-2,3-dihydroxypropyl amide of an unsaturated higher fatty acid which substantially inhibits fogging of films prepared from the thermoplastic.

Other objects of this invention will be apparent from the detailed description appearing hereinbelow.

According to this invention it has been found that N-2,3-dihydroxypropyl amides of cis unsaturated higher fatty acids, as hereinafter described, will substantially inhibit fogging in films prepared from thermoplastic materials. It has also been found that these same materials generally inhibit the tendency of films formed from the thermoplastic materials to pick up and retain electrostatic charges which often cause oppositely charged particles of dust and lint to collect on the film. The collection of dirt and lint on a film is, of course, unsightly and highly undesirable, particularly in food packaging.

A significant feature of this invention is that the amide employed must be an N-2,3-dihydroxypropyl amide of a cis unsaturated higher fatty acid. If the N-2,3-dihydroxypropyl amide is one of a trans unsaturated higher fatty acid or even of a saturated higher fatty acid, it will not be an effective antifogging agent and/or will not inhibit the tendency of a thermoplastic to pick up and retain an electrostatic charge.

By the practice of this invention, the properties of any of the thermoplastic materials which will form film are improved. These thermoplastic materials are characterized by their ability to be formed by the application of heat and generally become soft and pliable at temperatures of at least 60° and usually up to about 350° C., although many of the resins can be formed at temperatures in the range of about 150° to about 300° C. In general, the thermoplastic materials employed in film formation are solid polymeric resins such as cellulose esters, condensation polymers such as polycarbonates, polyesters and polyamides, and in general, polymers of the ethylenically unsaturated polymerizable monomers including vinyl esters, nitriles, acrylates, methacrylates, halides, ethers, olefins, diolefins and the like, as exemplified by acrylonitrile, methacrylonitrile, styrene, vinyl chloride, vinylidene chloride, vinyl acetate, N-isopropyl acrylamide, ethylene, propylene, butene, butadiene, isoprene and the like.

As already indicated, any of the thermoplastic materials which will form films can be employed in the practice of this invention. However, the preferred thermoplastic materials are the polyolefins formed by polymerizing one or more monomers having the formula $CH_2=CHR$ where R is hydrogen or a hydrocarbon radical, preferably an aliphatic or aromatic radical containing up to 20 carbon atoms. These polyolefins generally exhibit an inherent viscosity in tetralin at 145° C. in the range of about 0.1 to about 25, often 0.2 to about 6 and densities (ASTM D-1505) in the range of about 0.8 to about 1, and preferably about 0.85 to about 0.97. Such polymers generally form highly transparent film and the hydrocarbon polymers of the $\alpha$-monoolefins containing 2–10 carbon atoms, preferably 2–6 carbon atoms particularly, have been used extensively as packaging materials for meats and other food products. Film formed from homo and copolymers of such aliphatic $\alpha$-monoolefins and having either high or low inherent viscosities will exhibit improved resistance to fogging when they are blended with the specific additives disclosed herein.

The antifogging agent employed in the practice of this invention is an N-2,3-dihydroxypropyl amide of a cis unsaturated higher fatty acid or, stated another way, it is a glyceryl monamide of a cis unsaturated higher fatty acid. These amides can be defined by the following formula:

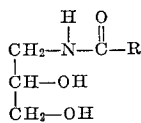

where

is the acyl moiety of a cis unsaturated higher fatty acid and R is an acyclic hydrocarbon radical. The cis unsaturated higher fatty acids from which the amides are derived generally contain at least 12 carbon atoms and no more than about 24 carbon atoms, although the amides preferred in the practice of this invention are derived from the fatty acids which contain 16 to 22 carbon atoms. Suitable cis unsaturated higher fatty acids are free of functional side chain substituents such as hydroxyl groups although non-functional substituents such as alkyl, preferably lower alkyl containing up to 8 carbon atoms, can be present without adversely affecting the antifogging properties of the amide. As already indicated, any of the fatty acids having the above formula in which R is an acyclic hydrocarbon, preferably containing 11–23 carbon atoms, are suitable in the practice of this invention. These olefinic acids can contain several ethylenic or even acetylenic bonds, but at least one of the ethylenic bonds must be cis if the acid is to form an N-2,3-dihydroxypropyl amide which is to be employed in the practice of this invention.

The N-2,3-dihydroxypropyl amides of cis unsaturated higher fatty acids employed in the practice of this invention can be prepared by reacting 3-amino-1,2-propanediol with one or more triglycerides of cis unsaturated higher fatty acids, with cis unsaturated higher fatty acids or with cis unsaturated higher fatty acid esters. The N-2,3-dihydroxypropyl amides of two saturated higher fatty acids, i.e., N-2,3-dihydroxypropyl stearamide and N,2-3- dihydroxypropyl lauramide, and their process of preparation are disclosed by Bermann et al. in Z. Physiol. Chem. 137, 46–61 (1924). The Bergmann et al. method can be employed to prepare the antifogging agents of this invention. This method, as practiced under the concept of this invention, comprises reacting a cis unsaturated higher fatty acid chloride with 5-chloromethyl-2-phenyloxazolidine, hydrolyzing the reaction product with hydrochloric acid, heating the resulting product with water and finally treating with potassium hydroxide solution. Many of the cis unsaturated higher fatty acids from which the N-2,3-hydroxypropyl amides employed in the practice of this invention can be obtained by hydrolyzing such natural oils as beef tallow, mutton tallow, butter fat, coconut oil, peanut oil, cotton seed oil, soybean and sesame oil. Specific examples include cis-9-dodecenoic acid ($D^9$-dodecylenic), cis-5-tetradecenoic acid, cis-7-tetradecenoic acid, cis-9-tetradecenoic acid, cis-9-hexadecenoic acid (palmitoleic [cis]), cis - 6 - octadecenoic acid, cis-9-octadecenoic acid (olic [cis]), 12-methyl-9,11-octadecadienoic acid (with at least one double bond cis), cis-11-octadecenoic acid (vaccenic [cis]), cis-9-eicosenoic acid, cis-11-eicosenoic acid, cis-15-tetracosenoic acid, cis-21-tricosenoic acid, 9,12-octadecadienoic acid (with at least one double bond being cis) (linoleic), 9,12,15-octadecatrienoic acid (with at least one double bond being cis), 6,9,12-octadecatrienoic acid (with at least one double bond being cis), 9,11,13-octadecatrienoic acid (with at least one double bond being cis), 6,10,14-hexadecatrienoic acid (with at least one double bond being cis), cis-octadeca-17-en-9,11-diynoic acid, cis-octadeca-17-en-9,15-diynoic acid, the tetra-, penta-, hexaethenoic unsaturated higher fatty acids where at least one double bond is cis, for example, parinaric or arachidonic acids, or the like.

The compositions of this invention can be prepared by any method suitable for combining one or more of the N-2,3-dihydroxypropyl amides with the thermoplastic material. One such method involves coating the surface of the thermoplastic material with one or more of the amides as, for example, by dispersing or dissolving the selected amide in a volatile solvent therefor, coating the thermoplastic surface therewith and permitting the solvent to evaporate. A suitable method for homogeneously incorporating the amides into the thermoplastic materials comprises heating them together to at least the melting point of the thermoplastic material in a suitable mixing apparatus such as an extruder, a Banbury mixer or heated differential mixing rolls, until a homogeneous is formed, solidifying the mixture by cooling and then comminuting the cooled mixture to a particle size satisfactory for hot melt extrusion or equivalent heat-shaping operation to form film, molded objects and the like.

In general, the amount of N-2,3-dihydroxypropyl cis unsaturated fatty acid amide employed in practicing this invention is in the range of about .01 to about 5%, with percentages in the range of about .1 to about .5% being preferred. The resulting compositions are particularly suited to the formation of unsupported solid film, generally having a thickness in the range of about .5 to about 100 mils. It is, of course, possible to use larger or smaller amounts of anti-fog agent but the more significant results are achieved within the aforementioned ranges. The compositions of this invention can, of course, also contain small amounts of other desirable additives such as stabilizing agents, anti-block and slip agents, and the like, provided the additional ingredients do not adversely affect the desired properties of the composition.

This invention can be further illustrated by the following examples of preferred embodiments thereof although it will be understood that these examples are included merely for purposes of illustration and are not intended to limit the scope of the invention unless otherwise specifically indicated:

EXAMPLE 1

As already indicated, the N-2,3-dihydroxypropyl amides employed in the practice of this invention can be prepared from the methyl esters of the corresponding cis unsaturated higher fatty acids. To illustrate, 112 grams (0.388 mole) of the methyl esters of lard fatty acids, which esters are conveniently prepared from lard by base-catalyzed methanolysis according to, for example, Planck et al., J. Am. Oil Chemists Soc., 33, 350, (1956), are obtained. The fatty acid moieties of lard generally consist essentially of the oleic, linoleic, palmitic, stearic and myristic acid moieties at an approximate weight ratio of 48:12:26:12:1.

These methyl esters and 41.5 grams (0.456 mole) of 3-amino-1,2-propanediol are admixed and stirred under nitrogen at 30 millimeters mercury pressure at 160° C. for three hours. The reaction mixture thus obtained is cooled to room temperature and the cooled reaction mixture is taken up in a 50:50 (volume base) ether-chloroform solution and washed with very dilute hydrochloric acid and water. The ether and chloroform are evaporated from the washed reaction mixture leaving a residue which typically weighs about 129 grams. This material is crystallized at 5° C. from 90% aqueous ethanol present at a ratio of 5 milliliters per gram of material. The crystalline material thus obtained consists essentially of the N-(2,3-dihydroxypropyl) amide of the saturated fatty acids of lard. A typical yield of the crystalline material is 40 grams.

The mother liquor recovered as a filtrate from the crystalline material is subjected to a four stage countercurrent extraction with 85% aqueous ethanol and petroleum ether. The ethanol and the water in the ethanol phase obtained in the extraction procedure are removed, leaving N-(2,3-dihydroxypropyl) amides of cis unsaturated higher fatty acids of lard. The total product consists essentially of the amides of the cis forms of oleic and linoleic acids, palmitamide, stearamide and myristamide at the approximate weight ratio of 48:12:26:12:1. A typical weight of the product thus obtained is about 100 grams, representing a yield of 75%.

EXAMPLE 2

This example illustrates the preparation of N-(2,3-dihydroxypropyl) cis oleamide by another process of the type described hereinbefore. Thus, 69.85 grams (0.247 mole) of cis oleic acid and 20.16 grams (0.221 mole) of 3-amino-1,2-propanediol are thoroughly admixed at room temperature in a 500 milliliter, three neck flask equipped with a stirrer, thermometer, inlet tube for nitrogen and outlet tube for water vapor. The mixture which is thick and viscous, is heated slowly without stirring to 120° C. at which temperature melting occurs and water vapor is given off. The reaction mixture is then heated with stirring to 150–160° C. and held at this temperature for two hours. It is typical for the reaction mixture to become a clear, homogeneous liquid after one-half hour at 150° C. At the end of the two hour reaction period, the reaction mixture is cooled slightly and then decanted into 125 milliliters of acetone. The resulting solution is cooled to 4° C., whereupon crystalline solids form. The solids and acetone are separated. The solids, the desired product, consist essentially of N-(2,3-dihydroxypropyl) oleamide. A typical amount of the product thus obtained is 52.81 grams, equal to a yield of 67.3%.

Similar results are obtained when oleic acid is substituted with one or more of the other cis unsaturated higher fatty acids.

EXAMPLE 3

As previously indicated, the N-2,3-dihydroxypropyl amides of this invention can be formed from the corresponding glycerides of the appropriate fatty acid. To illustrate, 122 grams (0.138 mole) of olive oil (having the fatty acid moieties of oleic acid, linoleic acid, palmitic acid and stearic acid at the approximate weight ratio of 83:7:6:4) and 44.4 grams (0.488 mole) of 3-amino-1,2-propanediol are admixed, heated to 150–160° C. and stirred for two hours at this temperature in a nitrogen atmosphere. After about one hour the initially heterogeneous mixture generally becomes homogeneous. The reaction mixture is cooled to about 20–25° C., whereupon it solidifies, and then it is distributed between an aqueous ethanol solution (ethanol at 80% by weight and water at 20% by weight) and petroleum ether (a preferred commercial petroleum ether being marketed as Skellysolve F). The resulting ethanolic phase is concentrated by distillation under aspirator vacuum, diluted with water and then extracted with ethylene dichloride. The extract is then water washed. In this step it is possible for aqueous emulsions to form, which emulsions are only partially broken by salt. Hence, under such conditions loses can occur in performing the water washing step. The ethylene dichloride is removed from the washed extract by distillation at pressures lower than 1 millimeter of mercury and at about 70° C. The residue is the desired product, namely: an N-(2,3-dihydroxypropyl) amide product derived from olive oil. A typical weight of the product is 122.6 grams, representing a yield of 70.9%. It consists essentially of N-(2,3-dihydroxypropyl) amides of cis oleic and linoleic acids, N-(2,3-dihydroxypropyl) linoleamide, N-(2,3-dihydroxypropyl) palmitamide and N-(2,3-dihydroxypropyl) stearamide at an approximate weight ratio of 83:7:6:4.

EXAMPLE 4

The N-2,3-dihydroxypropyl amides of the cis unsaturated higher fatty acids are effective anti-fogging agents for thermoplastic film forming materials, particularly polyolefins, and also generally improve the antistatic properties of such materials. To illustrate, these amides are incorporated into film forming polyethylene (inherent viscosity in tetralin at 145° C. approximately 0.9 and a density of about 0.924) in pellet form using solutions of the amides in isopropyl alcohol. The isopropyl alcohol is removed by drying in a circulating air oven at 50° C. and the pellets extruded into film of approximately 1.5 mils in thickness. The fogging characteristics of samples of the films are determined as follows:

A 250 ml. beaker is filled to within one-half inch of the top with water and heated to 120° F. A piece of film (approximately 4 x 4 inches) is quickly placed over the mouth of the beaker. A sample of the same polyethylene film containing no amide is also employed in this procedure for comparative purposes. The results are set forth in Table 1 which follows.

Samples of the film are also treated to determine antistatic properties. For this determination, the sensitivity of the film to attract cigarette ashes is observed. To make this determination, fresh cigarette ashes, crushed by gentle pressing on a smooth surface, are arranged in a circular pile approximately five inches in diameter and one-quarter inch in depth. A sample of film is rubbed with a clean wool for 25 strokes and transferred to an insulated slide bar located above the pile of cigarette ashes and rapidly lowered to the point at which ash particles are attracted to the sample. The distance between the sample and the pile of ashes is measured in inches. At least two different areas of the film sample are measured in this manner and the average is recorded as the ash pick-up distance. The results are set forth in Table 1 which follows:

TABLE 1

| Run | Additive | Concentration, weight percent | Time required for water vapor to coalesce at film surface, hrs. | Ash pick-up |
|---|---|---|---|---|
| 1 | None | | >8 | 3 |
| 2 | N-2,3-dihydroxypropyl amide of cis-9-octadecenoic acid (from olive oil). | .1 | 0 | 1.8 |
| 3 | N-2,3-dihydroxypropyl amides of cis-9, cis-12 octadecadienoic acid and cis-9-octadecenoic acids (from safflower oil). | .1 | 0 | 1.8 |
| 4 | N-2,3-dihydroxypropyl amides of cis-13-docosenoic acid. | .1 | 0 | 2.5 |

As can be observed from the data set forth in Table 1, the addition of the N-2,3-dihydroxypropyl amides of the cis unsaturated higher fatty acids significantly improves the fog resistance of thermoplastic film materials. The antistatic properties of the compositions generally show improvement also.

EXAMPLE 5

The N-2,3-dihydroxypropyl amides employed in the practice of this invention are unique in their action as anti-fog agents. To illustrate, the procedures of Example 4 are repeated employing an amide of a trans form of an unsaturated higher fatty acid, a saturated higher fatty acid and a hydroxy substituted cis unsaturated higher fatty acid. The results are set forth in Table 2 which follows:

TABLE 2

| Run | Additive | Concentration, weight percent | Time required for water vapor to coalesce at film surface, hrs. | Ash pick-up |
| --- | --- | --- | --- | --- |
| 1 | N-2,3-dihydroxypropyl amide of trans-9-octadecenoic acid. | .1 | >8 | 4.3 |
| 2 | N-2,3-dihydroxypropyl amide of octadecanoic acid. | .1 | >8 | 4 |
| 3 | N-2,3-dihydroxypropyl amide of 12-hydroxy-cis-9, octadecenoic acid. | .1 | >8 | 3 |

EXAMPLE 6

The N-2,3-dihydroxypropyl amides of cis unsaturated higher fatty acids can be employed to improve antifogging properties of a wide variety of thermoplastic materials and will often improve the antistatic properties of these materials. To illustrate, the N-2,3-dihydroxypropyl amide of cis-9-octadecenoic acid (oleic[cis]) in methanol solution, is coated on films having thicknesses of .5 to about 25 mils prepared from various commercially available thermoplastic materials. The procedure of Example 4 is employed. The fogging and electrostatic properties of the films are determined as in Example 4. The results obtained are set forth in Table 3 which follows:

We claim:
1. A composition comprising a film forming thermoplastic material and an N-2,3-dihydroxypropyl amide having the formula:

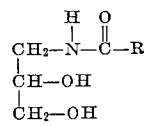

where

is the acyl moiety of a cis unsaturated higher fatty acid and R is an acyclic hydrocarbon radical.

TABLE 3

| Run | Thermoplastic | Antifogging [1] | | Antistatic [2] | |
| --- | --- | --- | --- | --- | --- |
| | | Control, no additive | Coated [3] | Control, no additive | Coated [3] |
| 1 | Cellophane | <0.2, >0.1 | 0 | <1.0 | <1.0 |
| 2 | Cellophane, coated [4] | 14 | 0 | <1.0 | <1.0 |
| 3 | Cellulose acetate | >4, <14 | 0 | 4.3 | 1.5 |
| 4 | Cellulose acetate butyrate | >14 | 0 | 3.8 | 2.0 |
| 5 | Chlorinated polyether (poly-3,3-bis chloromethyl oxetane, density 1.5). | >14 | 0 | 2.8 | 2.3 |
| 6 | Polyamide (poly caprolactam) | >14 | 0 | 4.3 | 2.3 |
| 7 | Polyethylene, density 0.92, melt index 7 | >14 | 0 | 4.0 | 3.3 |
| 8 | Polyethylene, density 0.97, melt index 0.7 | >14 | 0 | 3.8 | 2.0 |
| 9 | Polypropylene, density 0.9 | >14 | 0 | 4.0 | 2.5 |
| 10 | Butene-propylene copolymer (40% by weight, butene). | >14 | 0 | 4.0 | 2.0 |
| 11 | Polyester (polyethylene terephthalate) | >14 | 0 | 4.5 | 2.5 |
| 12 | Polystyrene, density 1.06 | >14 | 0 | 3.3 | 2.0 |
| 13 | Vinylidene chloride/vinyl chloride copolymer, density 1.7. | >14 | 0 | 3.8 | 1.5 |

[1] Hours required for clearance of fog droplets on film.
[2] Inches at which the sample attracts cigarette ashes under test conditions described in Example 4.
[3] Film coated with a 1% w./v. of N-2,3-dihydroxy propyl amide of the cis unsaturated higher fatty acid in methanol to give approximately 0.4% additive on film.
[4] Coated with a polyvinylidene chloride/acrylonitrile copolymer.

Thus, by the practice of this invention, there is provided to the art thermoplastic compositions exhibiting improved properties, particularly fog resistance in film form. In addition, it is significant to note that this improvement in fog resistance is realized without any substantial adverse affect on the other valuable physical properties such as clarity, toughness or the like of the thermoplastic in film form. Accordingly, the thermoplastic materials, particularly the polyolefins, can be formed into films which are particularly useful in packaging food products such as fresh meats, and other moisture containing products without interfering with visual identification of the packaged contents. In addition, the improvement in fog resistance will be imparted to thermoplastic materials used in molded or cast objects, as exemplified by plastic sideboards and the like, as well as in film form.

Although the invention has been described in considerable detail with reference to certain preferred embodiments thereof, it will be understood that variations and modifications can be effected without departing from the spirit and scope of the invention as described hereinabove and as defined in the appended claims.

2. The composition of claim 1 in which the film forming thermoplastic material is a polyolefin.

3. The composition of claim 1 in which

is the acyl moiety of a cis unsaturated higher fatty acid containing 12–24 carbon atoms.

4. The composition of claim 1 in which

is the acyl moiety of a cis unsaturated higher fatty acid containing 16–22 carbon atoms.

5. A composition comprising a film forming polyethylene and the N-2,3-dihydroxypropyl amide of cis-9-octadecenoic acid.

6. A composition comprising a film forming polyethylene and the N-2,3-dihydroxypropyl amide of cis-13-docosenoic acid.

7. Film comprising a thermoplastic material which is normally susceptible to moisture fogging in film form upon exposure to humid atmosphere and an N-2,3-dihydroxypropyl amide having the formula:

$$\begin{array}{c} \text{H} \quad \text{O} \\ | \quad \| \\ CH_2-N-C-R \\ | \\ CH-OH \\ | \\ CH_2-OH \end{array}$$

where $$\begin{array}{c} \text{O} \\ \| \\ R-C \end{array}$$

is the acyl moiety of a cis unsaturated higher fatty acid and R is an acyclic hydrocarbon radical.

8. An unsupported solid film about .5 to about 100 mils in thickness comprising a film forming thermoplastic material and an N-2,3-dihydroxypropyl amide having the formula:

$$\begin{array}{c} \text{H} \quad \text{O} \\ | \quad \| \\ CH_2-N-C-R \\ | \\ CH-OH \\ | \\ CH_2-OH \end{array}$$

where $$\begin{array}{c} \text{O} \\ \| \\ R-C \end{array}$$

is the acyl moiety of a cis unsaturated higher fatty acid and R is an acyclic hydrocarbon radical.

9. The film of claim 8 in which the thermoplastic material is polyethylene and the amide is the N-2,3-dihydroxypropyl amide of cis-9-octadecenoic acid.

10. The film of claim 8 in which the thermoplastic material is polyethylene and the amide is N-2,3-dihydroxypropyl amide of cis-13-docosenoic acid.

No references cited.

JOSEPH L. SCHOFER, *Primary Examiner.*

L. EDELMAN, *Assistant Examiner.*